US012454484B2

(12) United States Patent
Ju et al.

(10) Patent No.: US 12,454,484 B2

(45) Date of Patent: Oct. 28, 2025

(54) PREPARATION METHOD FOR ADMIXTURE FOR PLASTERBOARD, ADMIXTURE PREPARED THEREBY, AND COMPOSITION FOR FORMING PLASTERBOARD COMPRISING SAME

(71) Applicant: SILKROAD C&T, Seoul (KR)

(72) Inventors: Young Gil Ju, Daejeon (KR); Dae Jin Kim, Cheonan-si (KR); Min Jae Lee, Asan-si (KR); Ju Hwan Kim, Yongin-si (KR); Cheol Yong Cha, Hwaseong-si (KR); Kwang Young Park, Yongin-si (KR)

(73) Assignee: SILKROAD C&T, Seoul (KR)

( * ) Notice: Subject to any disclaimer, the term of this patent is extended or adjusted under 35 U.S.C. 154(b) by 885 days.

(21) Appl. No.: 17/596,112

(22) PCT Filed: May 11, 2020

(86) PCT No.: PCT/KR2020/006140

§ 371 (c)(1),
(2) Date: Dec. 3, 2021

(87) PCT Pub. No.: WO2020/246718

PCT Pub. Date: Dec. 10, 2020

(65) Prior Publication Data

US 2022/0227668 A1 Jul. 21, 2022

(30) Foreign Application Priority Data

Jun. 5, 2019 (KR) ........................ 10-2019-0066363
Jan. 31, 2020 (KR) ........................ 10-2020-0011517

(51) Int. Cl.

| | |
|---|---|
| ***C04B 24/22*** | (2006.01) |
| ***C04B 24/26*** | (2006.01) |
| ***C04B 28/14*** | (2006.01) |
| ***C04B 40/00*** | (2006.01) |
| ***C04B 103/14*** | (2006.01) |
| ***C04B 111/40*** | (2006.01) |
| ***C08F 12/08*** | (2006.01) |

(52) U.S. Cl.

CPC .......... *C04B 24/22* (2013.01); *C04B 24/2647* (2013.01); *C04B 28/14* (2013.01); *C04B 40/0039* (2013.01); *C08F 12/08* (2013.01); *C04B 2103/14* (2013.01); *C04B 2111/40* (2013.01); *C08F 2810/00* (2013.01)

(58) Field of Classification Search

CPC ............ C04B 2103/14; C04B 2103/40; C04B 2111/0062; C04B 2111/40; C04B 24/22; C04B 24/2647; C04B 28/14; C04B 28/145; C04B 38/02; C04B 40/0039; C08F 12/08; C08F 212/08; C08F 2810/00; C08F 8/36; C08L 25/04; C08L 25/06; C08L 25/08; C08L 25/16; C08L 25/18

See application file for complete search history.

(56) References Cited

U.S. PATENT DOCUMENTS

| | | | |
|---|---|---|---|
| 4,300,324 | A | 11/1981 | Koeppel |
| 7,544,242 | B2 | 6/2009 | Liu et al. |
| 2006/0278128 | A1 | 12/2006 | Liu et al. |
| 2006/0278129 | A1 | 12/2006 | Liu et al. |
| 2013/0330532 | A1 | 12/2013 | Dierschke et al. |
| 2016/0244365 | A1 | 8/2016 | Ikeda et al. |

FOREIGN PATENT DOCUMENTS

| | | | |
|---|---|---|---|
| GB | 1 590 419 | A | 6/1981 |
| JP | 53-88824 | A | 8/1978 |
| JP | 53-92832 | A | 8/1978 |
| JP | 01-188448 | A | 7/1989 |
| JP | 1-224249 | A | 9/1989 |
| JP | 2-240116 | A | 9/1990 |
| JP | 2013-544742 | A | 12/2013 |
| KR | 10-2008-7001092 | A | 4/2008 |
| WO | 2007/140567 | A2 | 12/2007 |
| WO | 2013/137400 | A1 | 9/2013 |

OTHER PUBLICATIONS

JP 1-224249 A (Sep. 7, 1989) machine translation.*

Cristiane R. Martins, et al., "Synthesis in pilot plant scale and physical properties of sulfonated polystyrene", Journal of the Brazilian Chemical Society, 2003, pp. 797-802, vol. 14, No. 5.

Jessica E. Coughlin, et al., "Sulfonation of polystyrene: Toward the "Ideal" polyelectrolyte", Journal of Polymer Science, Part A: Polymer Chemistry, 2013, pp. 2416-2424, vol. 51, No. 11.

International Search Report for PCT/KR2020/006140 dated Aug. 21, 2020 [PCT/ISA/210].

* cited by examiner

*Primary Examiner* — Ana L. Woodward

(74) *Attorney, Agent, or Firm* — Sughrue Mion, PLLC

(57) ABSTRACT

A method of preparing an admixture for a plasterboard is disclosed. An admixture prepared by the method and a composition for forming a plasterboard containing the admixture are also disclosed. The method includes sulfonation of polystyrene using sulfuric acid to give an admixture including a sulfonated polystyrene (SPS)-based compound of formula 1 below. The admixture enables regulation of properties of a plasterboard, such as foam size, flowability, and setting time, by regulating a degree of sulfonation (DS) of the SPS-based compound:

Formula 1

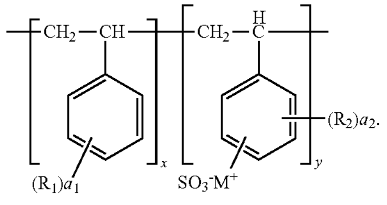

12 Claims, 4 Drawing Sheets

PREPARATION METHOD FOR ADMIXTURE FOR PLASTERBOARD, ADMIXTURE PREPARED THEREBY, AND COMPOSITION FOR FORMING PLASTERBOARD COMPRISING SAME

CROSS REFERENCE TO RELATED APPLICATIONS

This application is a National Stage of International Application No. PCT/KR2020/006140 filed May 11, 2020, claiming priority based on Korean Patent Application No. 10-2019-0066363 filed Jun. 5, 2019 and Korean Patent Application No. 10-2020-0011517 filed Jan. 31, 2020.

TECHNICAL FIELD

The present invention relates to a method for preparing an admixture for a plasterboard, an admixture prepared thereby, and a composition for forming a plasterboard including the same.

More specifically, the present invention provides an admixture for a plasterboard including a sulfonated polystyrene (SPS)-based compound, and in particular, provides a technology that improves the properties of a plasterboard, such as foam size, flowability, and setting time, by regulating a degree of sulfonation (DS) of a SPS-based compound.

BACKGROUND ART

Plasterboards are widely used as building interior materials thanks to their low price and excellent properties, such as fire protection, sound insulation, and heat insulation. There are various types of plasterboards, such as regular boards, hard boards, reinforced boards, and decorative boards. The type of additive, the amount of combination, the addition of the reinforcing material, etc. may vary depending on the required characteristics of each plasterboard.

In general, these various types of plasterboards may be prepared by placing a slurry consisting of calcined gypsum, water and some additives between parallel sheets of facing paper, adjusting a thickness and a width thereof, and then performing hardening, cutting, and drying thereon. In this case, as an additive, an admixture may be used as a dispersant for dispersing the gypsum particles in water. This may reduce the amount of water used and may increase drying efficiency when preparing a plasterboard, thereby increasing productivity.

On the other hand, it is known that the addition of a dispersant to a gypsum slurry may change the size distribution of foams and the size distribution of pores caused by the foams. In addition, dispersants may delay the hardening of the gypsum slurry and further inhibit the high-speed preparation of plasterboard products such as wallboards. Therefore, when the amount of the dispersant added is increased so as to improve a flowability, the hardening time may increase. When the wallboard is not sufficiently hardened on a cutting knife, the shape of the product is not fixed and difficulty in handling the board after cutting may follow. Therefore, it is necessary to reduce a line speed so as to harden the board and maintain its shape. As such, in the complex relationship between the chemical properties of the dispersant or admixture, the foam size, and the flowability of the slurry, it is still a problem to be solved to prepare a gypsum slurry that satisfies both the foam size distribution and the flowability without delay in hardening time.

Korean Patent Application Laid-Open No. 10-2008-701092 discloses a dispersant that provides a slurry flowability and an appropriate foam size distribution. Korean Patent Application Laid-Open No. 10-2008-701092 discloses that, since desired foams are not formed when a PCE-based alone is used as a dispersant, PCE-based and PNS-based admixtures are separately added to a mixer and then used. However, the use of the mixture of PCE and PNS before the addition of the admixture is somewhat limited because a gel is formed.

Therefore, development of admixture materials capable of easily controlling performance such as a foam size of plasterboard, a flowability of admixture, and a setting time to thereby solve the existing problems is still actively in progress.

DESCRIPTION OF EMBODIMENTS

Technical Problem

The present invention aims to provide a sulfonated polystyrene (SPS)-based admixture for a plasterboard so as to improve performance of the admixture.

In particular, the present invention aims to control a degree of sulfonation (DS) of an SPS-based compound to improve the flowability, compared with a PNS-based admixture, shorten a setting time, and form foams in the same size.

Solution to Problem

An embodiment of the present invention provides a method for preparing an admixture for a plasterboard, including a sulfonated polystyrene (SPS)-based compound by a sulfonation reaction with polystyrene and sulfuric acid.

According to an embodiment of the present invention, a degree of sulfonation (DS) of the SPS-based compound is in a range of 15% to 99%.

The sulfonation is carried out by a polymerization method including a monomer styrene sulfonic acid, or a direct sulfonation method using a sulfonating agent in polystyrene that is a polymer.

According to an embodiment of the present invention, solvents in the sulfonation reaction include at least one selected from propane, butane, pentane, hexane, cyclohexane, acetone, dibromomethane, and dichlorobenzene.

According to an embodiment of the present invention, the sulfonating agents in the sulfonation reaction further including at least one selected from acetic anhydride, sulfuric acid, fuming sulfuric acid, and sulfur trioxide.

According to an embodiment of the present invention, a weight average molecular weight of the polystyrene is in a range of 10,000 to 800,000.

An embodiment of the present invention provides an admixture for a plasterboard prepared by the method described above.

An embodiment of the present invention provides a composition for forming a plasterboard, including gypsum, a hardening agent, a weight reducing agent, and water in the admixture for the plasterboard.

According to an embodiment of the present invention, the gypsum may be hemihydrate gypsum ($CaSO_4 \cdot 1//2H_2O$).

In this case, the composition for forming the plasterboard includes 0.1-2 parts by weight of the admixture for the plasterboard, 0.1-1 parts by weight of the hardening agent, 0.01-1 parts by weight of the weight reducing agent, and 60-150 parts by weight of the water, based on 100 parts by weight of the gypsum.

In this case, the admixture may further include a polycarboxylate ether (PCE)-based compound. In addition, a weight ratio of the SPS-based compound to a PCE-based compound is 10:90 to 90:10.

According to an embodiment of the present invention, the hardening agents may include at least one of potassium sulfate ($K_2SO_4$) and sodium sulfate ($Na_2SO_4$).

According to an embodiment of the present invention, the composition for forming the plasterboard may further include a hardening retardant.

An embodiment of the present invention provides a plasterboard using the composition for forming the plasterboard.

ADVANTAGEOUS EFFECTS OF DISCLOSURE

When a plasterboard is prepared by including a sulfonated polystyrene (SPS)-based admixture according to the present invention, or is prepared according to a degree of sulfonation (DS) of an SPS-based compound, it is possible to control a flowability and a setting time.

When a plasterboard is prepared by including an SPS-based admixture according to the present invention, it is possible to control a foam size as well as a flowability and a setting time according to a weight average molecular weight (Mw) of polystyrene.

Therefore, it is possible to provide an admixture having improved performance, compared with a conventional PNS-based admixture.

When a plasterboard is prepared using a composition for forming a plasterboard according to the present invention, it is possible to prepare a high-quality plasterboard having improved performance while reducing costs by shortening a setting time.

In addition, it is possible to prepare plasterboards of various weights suitable for use by controlling a molecular weight of an SPS-based compound, without additional processes or additives.

BEST MODE

Figure 1:
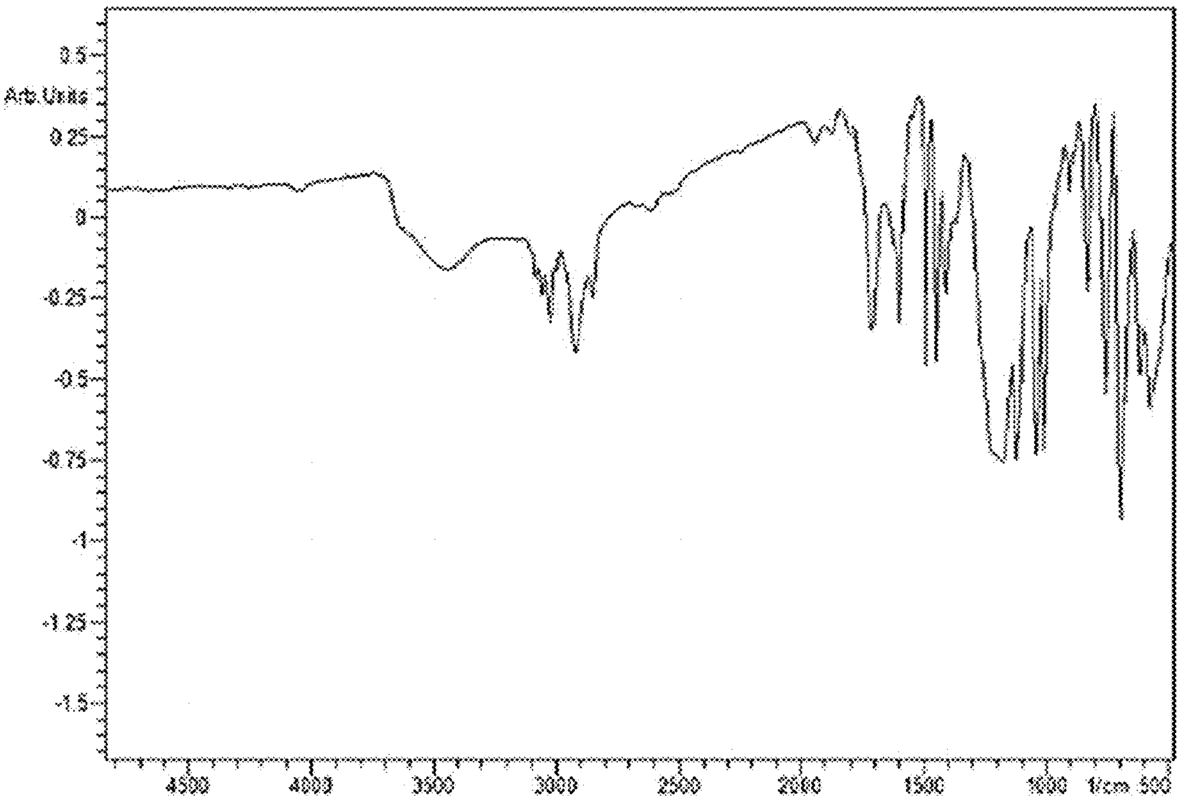
FIG. 1 shows an FT-IR spectroscopy that measures whether a sulfonic group is synthesized in polystyrene in a sulfonated polystyrene (SPS)-based compound according to the present invention.

Hereinafter, specific details and possible embodiments for carrying out the present invention will be described. However, descriptions known in the art may be applied to a configuration not specified in detail below, as long as the configuration is not against the purpose of the present invention.

In the present specification, when a layer or member is referred to as being "on" another layer or member, it will be understood that the layer or member may be in contact with the other layer or member, or intervening layers may be present between two layers or two members.

It will be understood that the terms "comprise," "include," or "have" as used herein specify the presence of stated elements, but do not preclude the presence or addition of one or more other elements.

The term "molecular weight" as used herein refers to "weight average molecular weight (Mw)", unless is otherwise defined.

[General Definition of Substituent]

In the present specification, a $C_1$-$C_{20}$ alkyl group refers to a linear or branched aliphatic monovalent hydrocarbon group having 1 to 20 carbon atoms, and specific examples thereof include a methyl group, an ethyl group, a propyl group, an isobutyl group, a sec-butyl group, a ter-butyl group, a pentyl group, an iso-amyl group, and a hexyl group.

In the present specification, a $C_2$-$C_{20}$ alkenyl group refers to a hydrocarbon group including one or more carbon double bonds in the middle or at the terminal of the $C_2$-$C_{20}$ alkyl group, and specific examples thereof include an ethenyl group, a propenyl group, and a butenyl group. In the present specification, a $C_2$-$C_{20}$ alkynyl group refers to a hydrocarbon group including one or more carbon triple bonds in the middle or at the terminal of the $C_2$-$C_{20}$ alkyl group, and specific examples thereof include an ethynyl group and a propynyl group.

In the present specification, a $C_1$-$C_{20}$ alkoxy group refers to a monovalent group having a formula represented by —$OA_{101}$ (where $A_{101}$ is the $C_1$-$C_{20}$ alkyl group), and specific examples thereof include a methoxy group, an ethoxy group, and an isopropyloxy group.

In the present specification, a $C_3$-$C_{10}$ cycloalkyl group refers to a monovalent saturated hydrocarbon monocyclic group having 3 to 10 carbon atoms, and specific examples thereof include a cyclopropyl group, a cyclobutyl group, a cyclopentyl group, a cyclohexyl group, and a cycloheptyl group. In the present specification, a $C_3$-$C_{10}$ cycloalkylene group refers to a divalent group having the same structure as the $C_3$-$C_{10}$ cycloalkyl group.

In the present specification, a $C_6$-$C_{20}$ aryl group refers to a monovalent group having a carbocyclic aromatic system having 6 to 20 carbon atoms. Specific examples of the $C_6$-$C_{20}$ aryl group include a phenyl group, an anthracenyl group, a phenanthrenyl group, a pyrenyl group, a chrysenyl group, and a fluorenyl group.

In the present specification, a $C_1$-$C_{20}$ heteroaryl group refers to a monovalent group including at least one heteroatom selected from N, O, Si, P and S as a ring-forming atom and having a heterocyclic aromatic system having 1 to 20 carbon atoms. Specific examples of the $C_1$-$C_{60}$ heteroaryl group include a pyridinyl group, a pyrimidinyl group, a pyrazinyl group, a pyridazinyl group, a triazinyl group, a quinolinyl group, an isoquinolinyl group, and a carbazolyl group.

[Method for Preparing Admixture for Plasterboard, and Admixture]

An embodiment of the present invention provides a method for preparing an admixture for a plasterboard including a sulfonated polystyrene (SPS)-based compound represented by Formula 1 below by a sulfonation reaction with polystyrene and sulfuric acid.

<Formula 1>

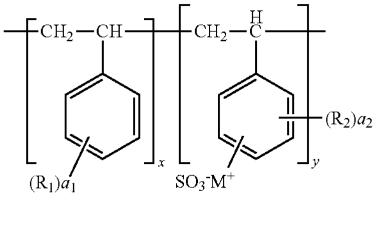

In Formula 1, $R_1$ and $R_2$ are selected from hydrogen, deuterium, —F, —Cl, —Br, —I, a hydroxyl group, a nitro group, a $C_1$-$C_{20}$ alkyl group, a $C_2$-$C_{20}$ alkenyl group, a $C_2$-$C_{20}$ alkynyl group, a $C_1$-$C_{20}$ alkoxy group, a $C_3$-$C_{10}$ cycloalkyl group, a $C_6$-$C_{20}$ aryl group, a $C_1$-$C_{20}$ heteroaryl group, a monovalent non-aromatic condensed polycyclic group, and a monovalent non-aromatic condensed heteropolycyclic group, a1 is an integer selected from 1 to 5, a2 is an integer selected from 1 to 4, $M^+$ is $H^+$, $Li^+$, $Na^+$, $K^+$, or $NH_4^+$, x is an integer selected from 5 to 50,000, and y is an integer selected from 0 to 50,000.

In the preparation of the plasterboard, a dispersible flow value(flowability) and a setting time (apparent termination) are important factors.

When the flowability is improved, by preventing premature setting of the gypsum during slurry mixing, it is possible to increase facility efficiency and finally provide improved hardening performance.

In the case of the setting time, when the setting or hardening time is prolonged and the hardening is not sufficient, the shape of the final product is not only unfixed and it is also inefficiently because the production time is also delayed. Therefore, in the preparation of the plasterboard, it is important to provide high flowability and shorten the setting time at the same time.

Therefore, the present invention aims to control a flowability and a setting time of a gypsum slurry used according to a degree of sulfonation (DS) of a polystyrene (PS)-based compound in order to provide the above-described performance.

In the present invention, any of the two methods may be adopted. That is, the sulfonation may be carried out by the polymerization using the monomer styrene sulfonic acid, or directly sulfonation of polystyrene by using a sulfonating agent, but the present invention is not limited thereto.

In the former case, as an embodiment, a method for polymerization including the monomer styrene sulfonic acid may be provided.

In addition, in the latter case, in an embodiment, the procedure of the method for directly sulfonating polystyrene is provided as follows.

First, an acetyl sulfate solution is prepared. An acid anhydride is prepared under an inert nitrogen condition to prepare an acetyl sulfate solution.

Then, after polystyrene is dissolved in an organic solvent, the acetyl sulfate solution is added thereto to prepare sulfonated polystyrene. The mechanism thereof is as follows.

[Mechanism: Acetyl Sulfate Solution Preparation]

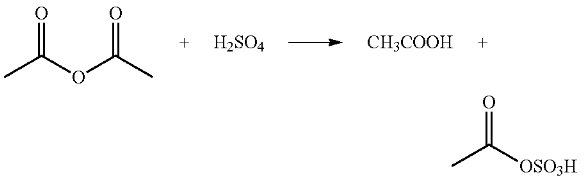

[Mechanism: Sulfonation Reaction]

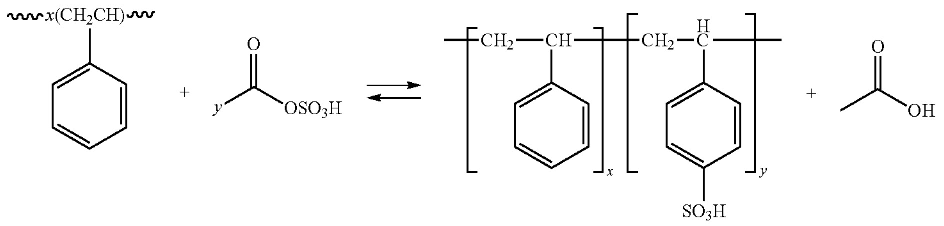

According to an embodiment of the present invention, the DS representing the degree of sulfonation of the sulfonated polystyrene (SPS)-based compound may be in a range of 15% to 99%. Preferably, the DS may be in a range of 15% to 95%. When the DS is lowered to 15% or less, the SPS-based compound is not dispersed in water, and when the DS is greater than 99%, the flowability is disadvantageous and the setting time is delayed. Therefore, when the DS is in a range of 15% to 99%, the flowability of the gypsum slurry is improved and the setting time is shortened.

On the other hand, there are various methods for sulfonation of polystyrene, and two methods are mainly used.

The first method is a polymerization using monomer styrene sulfonic acid (polystyrene sulfonic acid) (Jessica, E., "Sulfonation of Polystyrene: Toward the "Ideal" Polyelextrolyte", JOURNAL OF POLYMER SCIENCE, PART A: POLYMER CHEMISTRY, 2013, vol 51, 11, 2416-2424).

The second method is sulfonation of polymer polystyrene (Crisriane, R., "Synthesis in Pilot Scale and Physical Properties of Sulfonated Polystyrene". J. Braz. Chem. Soc., 2003, Vol. 14, No. 5, 797-802).

According to an embodiment of the present invention, the solvent in the sulfonation reaction is at least one selected from propane, butane, pentane, hexane, cyclohexane, acetone, dibromomethane, and dichlorobenzene, but is not limited thereto.

According to an embodiment of the present invention, a sulfonating agent may be used for the sulfonation reaction. In this case, at least one selected from acetic anhydride, sulfuric acid, fuming sulfuric acid, and sulfur trioxide may be provided as the sulfonating agent. In addition, any material is used without limitation as long as the material is a sulfonating agent capable of achieving a desired reaction, and sulfuric acid and acetic anhydride are preferably provided for the sulfonation reaction.

According to an embodiment of the present invention, the weight average molecular weight of the polystyrene is in a range of 30,000 to 400,000.

Preferably, the weight average molecular weight of the polystyrene is in a range of 35,000 to 350,000. According to Tables 1 and 2 to be described below, it can be confirmed that, in the above range, the flowability is improved and the setting time is shortened. Therefore, it can be confirmed that the performance are improved, compared with the currently commercially available PNS-based admixtures.

In addition, according to Table 3, since the foam size may also increase according to the weight average molecular weight, the foam size can be controlled by adjusting the molecular weight when necessary.

That is, in the present invention, the foam size of the plasterboard may be controlled by adjusting the molecular weight within the weight average molecular weight range (i.e., 10,000 to 800,000) of the polystyrene of the SPS-based compound.

An embodiment of the present invention provides an admixture for a plasterboard prepared by the method described above.

In this case, the admixture is an aqueous dispersion type. The aqueous solution is made by slowly adding a reaction solution having undergone the activation step to a separated container, while adding water to the container with stirring. The amount of water is not particularly limited. However, in consideration of workability or the like, the admixture may be freely added within a range including 1-60 parts by weight based on 100 parts by weight of water in a final product.

In this regard, the admixture according to the present invention may solve the problems of the flowability and the small foam size which have emerged when the conventional admixture is provided for the preparation of the plasterboard.

Therefore, since the foam size may be controlled by adjusting the molecular weight of the polystyrene of the SPS-based compound when necessary, plasterboards of various weights suitable for use may be prepared without additional processes or additives.

[Composition for Forming Plasterboard]

The composition for forming the plasterboard according to the present invention includes gypsum, an admixture, a hardening agent, a weight reducing agent, and water. The admixture includes an SPS-based compound represented by Formula 1 below as a sulfonation reaction with polystyrene and sulfuric acid.

<Formula 1>

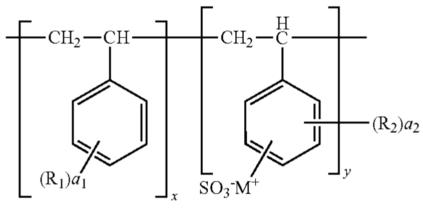

In Formula 1, $R_1$ and $R_2$ are selected from hydrogen, deuterium, —F, —Cl, —Br, —I, a hydroxyl group, a nitro group, a $C_1$-$C_{20}$ alkyl group, a $C_2$-$C_{20}$ alkenyl group, a $C_2$-$C_{20}$ alkynyl group, a $C_1$-$C_{20}$ alkoxy group, a $C_3$-$C_{10}$ cycloalkyl group, a $C_6$-$C_{20}$ aryl group, a $C_1$-$C_{20}$ heteroaryl group, a monovalent non-aromatic condensed polycyclic group, and a monovalent non-aromatic condensed heteropolycyclic group, a1 is an integer selected from 1 to 5, a2 is an integer selected from 1 to 4, $M^+$ is $H^+$, $Li^+$, $Na^+$, $K^+$, or $NH_4^+$, x is an integer selected from 5 to 50,000, and y is an integer selected from 0 to 50,000.

According to an embodiment of the present invention, the gypsum included in the composition for forming the plasterboard may be hemihydrate gypsum.

The gypsum refers to a very soft sulfate mineral including calcium sulfate ($CaSO_4$) as a main component. A plurality of types of gypsum are known according to a crystalline form. Among them, hemihydrate gypsum ($CaSO_4 \cdot 1/2H_2O$) may be obtained by heating dihydrate gypsum ($CaSO_4 \cdot 2H_2O$) to a temperature of 150° C. to 200° C., or by absorbing moisture in the air and calcining.

According to an embodiment of the present invention, the hemihydrate gypsum may be produced by calcining raw gypsum. Natural gypsum or chemical gypsum such as flue gas desulfurization (FGD) gypsum, phosphogypsum, titanogypsum, citrogypsum, tartarogypsum, borogypsum, or lactogypsum may be used as the raw gypsum. Alternatively, recycled gypsum recovered from waste plasterboards may be used as the raw gypsum, but the present invention is not limited thereto.

According to an embodiment of the present invention, an acid or a salt thereof, for example, citric acid or a salt thereof, malic acid or a salt thereof, succinic acid or a salt thereof, tartaric acid or a salt thereof, and the like may be blended together during calcination of the raw gypsum. When the acid or the salt thereof is blended together, the water-to-plaster ratio may be reduced when the plasterboard is prepared using the hemihydrate gypsum.

The blending amount of the acid or the salt thereof may be 0.01-10 parts by weight, 0.1-5 parts by weight, or 0.5-1 parts by weight, based on 100 parts by weight of the raw gypsum.

According to an embodiment of the present invention, the calcination of the raw gypsum may be performed in a temperature range of 150° C. to 200° C., for example, 160° C. to 180° C.

According to an embodiment of the present invention, the calcination of the raw gypsum may be performed using a calcination apparatus used in the art, such as a kettle or a rotary kiln, and the calcination apparatus used herein is not particularly limited.

According to an embodiment of the present invention, the calcined hemihydrate gypsum may be further pulverized into a form suitable for use in the composition by using a ball mill or a tube mill.

According to an embodiment of the present invention, the composition for forming the plasterboard includes 0.1-2 parts by weight of an admixture for a plasterboard, 0.1-1 parts by weight of a hardening agent, 0.01-1 parts by weight of a weight reducing agent, and 60-150 parts by weight of water, based on 100 parts by weight of gypsum.

The admixture for forming the plasterboard represented by Formula 1 may be included in an amount of 0.1-2 parts by weight, and preferably 0.1-1 part by weight, based on 100 parts by weight of the gypsum.

In addition, the weight average molecular weight of the polystyrene is in a range of 10,000 to 800,000. When the weight average molecular weight of the polystyrene is in the above-described range, the composition for forming the plasterboard may have high flowability and may provide an effect of shortening the hardening time and controlling the foam size.

According to an embodiment of the present invention, the admixture may further include, in addition to the SPS-based compound, at least one selected from a polynaphthalene sulfonate (PNS)-based compound, a polycarboxylate ether (PCE)-based compound, a lignin sulfonate-based compound, an alkylaryl sulfonic acid-based compound, a polyoxyethylene-based compound, an alkylaryl ether-based compound, an oxycarboxylic acid-based compound, a polycarbonic acid-based compound, and an aminosulfonic acid-based compound.

Preferably, the admixture may further include a PCE-based compound.

In this case, the weight ratio of the SPS-based compound to the PCE-based compound is 10:90 to 90:10. Preferably the weight ratio may be 40:60 to 60:40, and more preferably 45:55 to 55:45. As can be seen from the results of Table 1 and Table 2 below, it is possible to provide the composition for forming the plasterboard that has improved flowability and setting rate, compared with the conventional PNS system, by using the same together with the PCE system.

According to an embodiment of the present invention, the composition for forming the plasterboard includes a hardening agent, which promotes a hydration reaction between the gypsum and water, thereby increasing the productivity of the plasterboard.

According to an embodiment of the present invention, the hardening agent may include at least one of an inorganic compound and an organic compound.

The inorganic compound may include at least one selected from: chloride such as calcium chloride or potassium chloride; nitrite such as sodium nitrite or calcium nitrite; nitrate such as sodium nitrate or calcium nitrate; sulfate such as calcium sulfate, potassium sulfate, sodium sulfate, or aluminum sulfate; hydroxide such as sodium hydroxide or potassium hydroxide; carbonate such as calcium carbonate, sodium carbonate, or lithium carbonate; silicate such as sodium silicate or potassium silicate; and an alumina-based compound such as aluminum hydroxide or aluminum oxide. Preferably, potassium sulfate ($K_2SO_4$) or sodium sulfate ($Na_2SO_4$) may be provided.

In addition, the organic compound may include at least one selected from: amine such as diethanolamine or triethanolamine; calcium salt of organic acid such as calcium formate or calcium acetate; and maleic anhydride.

According to an embodiment of the present invention, the composition for forming the plasterboard includes 0.1-1 part by weight of the hardening agent based on 100 parts by weight of the gypsum. When the amount of the hardening agent is in the above-described range, the hardenability of the plasterboard prepared from the composition for forming the plasterboard increases, and the plasterboard may be controlled not to have brittleness due to excessive hardening.

According to an embodiment of the present invention, the composition for forming the plasterboard includes a weight reducing agent. The weight reducing agent controls the density of the plasterboard prepared from the composition for forming the plasterboard and generates foams in the plasterboard to reduce the weight of the plasterboard.

According to an embodiment of the present invention, the weight reducing agent may include a sulfate compound, a persulfate compound, a bisulfate compound, a carbonate compound, or a bicarbonate compound.

For example, the weight reducing agent may include ammonium persulfate ($(NH_4)_2S_2O_8$), sodium bicarbonate ($NaHCO_3$), ammonium sulfate ($(NH_4)_2SO_4$), or sodium bisulfate.

According to another embodiment of the present invention, the weight reducing agent may include an anionic surfactant such as an alkyl sulfate compound, an alkyl ether sulfate compound, an alkyl sulfonate compound, an alkyl ether sulfonate compound, an alkyl phosphate compound, an alkyl ether phosphate compound, an alkyl carbonate compound, and an alkyl ether carbonate compound.

For example, the weight reducing agent may include an anionic surfactant such as lauryl sulfonate, isotridecyl sulfonate, lauryl sulfate, isotridecyl sulfate, or stearyl sulfate, but is not limited thereto.

According to an embodiment of the present invention, the composition for forming the plasterboard may include 0.01-1 parts by weight of the weight reducing agent based on 100 parts by weight of gypsum. Preferably, the amount of the hardening agent is 0.01-0.1 parts by weight. When the amount of the weight reducing agent is in the above-described range, the weight of the plasterboard prepared from the composition for forming the plasterboard may be reduced and the physical properties of the plasterboard are not deteriorated due to excessive foam generation. According to an embodiment of the present invention, the composition for forming the plasterboard includes water. The water undergoes a hydration reaction with the hemihydrate gypsum to form a hard dihydrate gypsum.

According to an embodiment of the present invention, the composition for forming the plasterboard may include 60-150 parts by weight of the water based on 100 parts by weight of gypsum. Preferably, the amount of the water is 60-80 parts by weight.

According to an embodiment of the present invention, the composition for forming the plasterboard may further include a hardening retardant. Examples of the hardening retardant may include oxycarboxylic acid such as gluconic acid, citric acid, or glucoheptone, or inorganic salt thereof such as sodium, potassium, calcium, magnesium, or ammonium, sugars such as glucose, fructose, galactose, saccharose, xylose, arabinose, ribose, oligosaccharide, or dextran, and boric acid. The hardening retardant may be added so as to control the hardening rate in the preparation of the plasterboard, but the present invention is not limited thereto.

According to an embodiment of the present invention, the composition for forming the plasterboard may further include a strength improving agent. Examples of the strength improving agent may include silica fume, and fly ash, and the like. The strength improving agent may supplement the physical properties of the plasterboard.

In the hardening retardant and the strength improving agent, the composition for forming the plasterboard may be included in an amount of 0.1-10 parts by weight, for example, 0.5-5 parts by weight, based on 100 parts by weight of gypsum.

[Plasterboard]

An embodiment of the present invention provides a plasterboard including a composition for forming a plasterboard including gypsum, an admixture for a plasterboard, a hardening agent, a weight reducing agent, and water, and including the SPS-based compound represented by Formula 1 as described above.

The descriptions of the gypsum, the hardening agent, the weight reducing agent, the SPS-based compound, and the admixture are the same as described above.

According to an embodiment of the present invention, the plasterboard may be provided on an exterior material sheet and a gypsum core.

According to an embodiment of the present invention, the plasterboard may include a first exterior material sheet, a second exterior material sheet facing the first exterior material sheet, and a gypsum core disposed between the first exterior material sheet and the second exterior material sheet.

Each of the exterior material sheets may be a paper exterior material sheet or a fibrous exterior material sheet, but is not limited thereto, and those known in the art may be used without limitation.

Therefore, the plasterboard according to the present invention may have a high flowability and a shortened setting time at the time of preparation, thereby improve productivity. In addition, the plasterboard may include the SPS-based compound in the admixture, and thus the foam size may be controlled during the preparation.

Furthermore, it has excellent flowability, hardenability, hardness, and the like, and is environmentally friendly and harmless to the human body, compared with the case in which only the conventional PNS-based admixture is used.

Therefore, the plasterboard according to the present invention may be appropriately molded when necessary and usefully used as a building material.

Hereinafter, the following examples exemplify the present invention without limiting the scope of the present invention.

EXAMPLES

Preparation Example: Preparation of SPS-based Compound

1) Preparation of Acetyl Sulfate Solution

Acetic anhydride was cooled to 0° C. under an inert nitrogen condition, 95-97% sulfuric acid was added thereto, and the mixture was stirred at room temperature until the mixture became a clear solution.

2) Sulfonation

After polystyrene was dissolved in an organic solvent in a flask, nitrogen was purged for 30 minutes while the flask was heated to 40° C. Then, the acetyl sulfate solution was added thereto using a funnel and then stirred at 40° C. for 2 hours. Then, when the solution had a transparent yellow color, 2-propanol was added thereto for 30 minutes, and the reaction was terminated by cooling at room temperature to obtain a polymerized SPS-based compound. When necessary, the obtained compound was separated by washing with distilled water.

3) SPS-Based Compound

An admixture was prepared using the SPS-based compound prepared in Preparation Example 2).

Experimental Example 1: IR Measurement (Whether Sulfonic Group was Synthesized)

Figure 2:
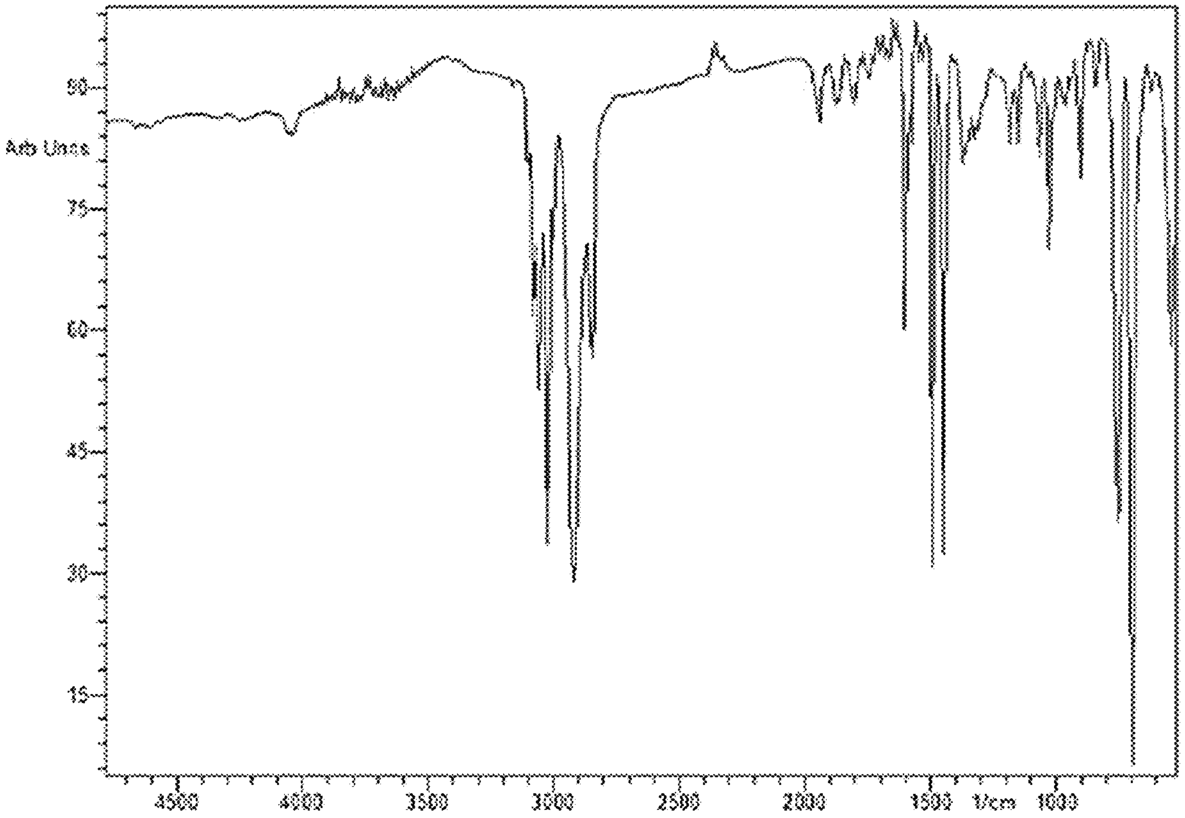
FIG. 2 shows an FT-IR spectroscopy of polystyrene that does not undergo a sulfonation reaction.
Figure 3:
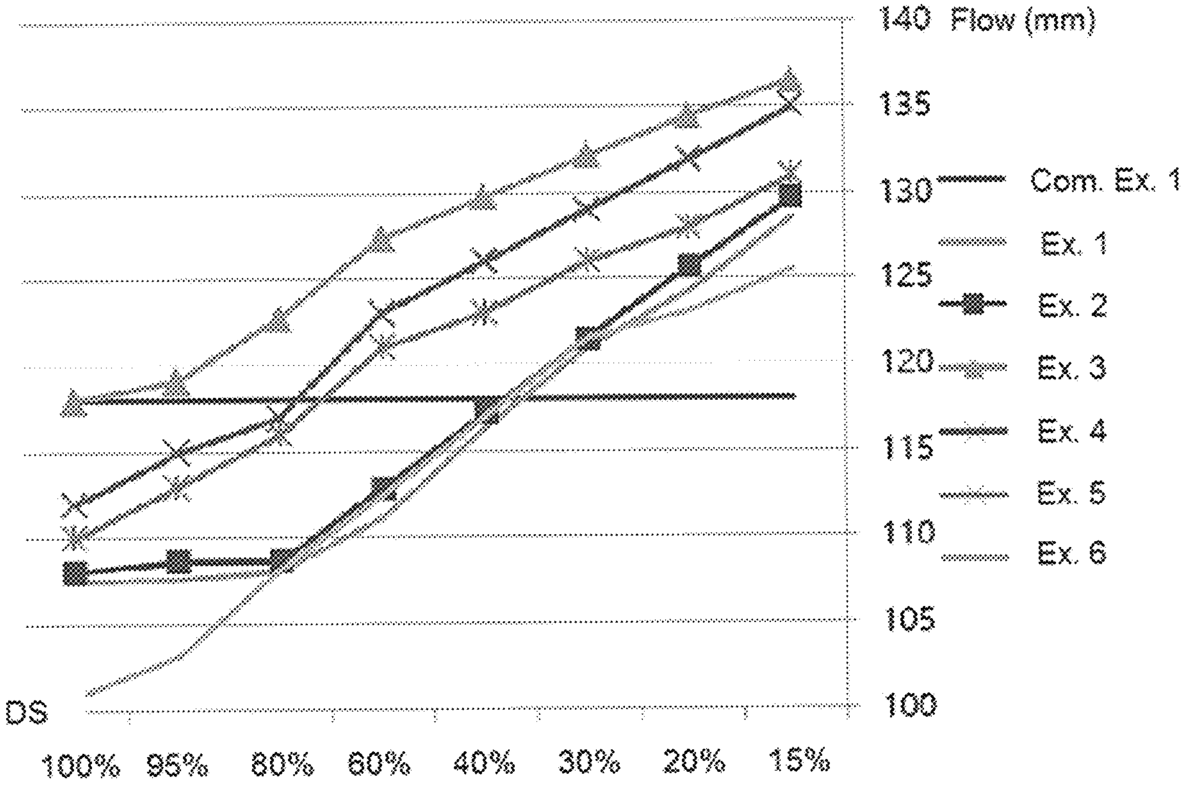
FIG. 3 shows the results of Table 1.
Figure 4:
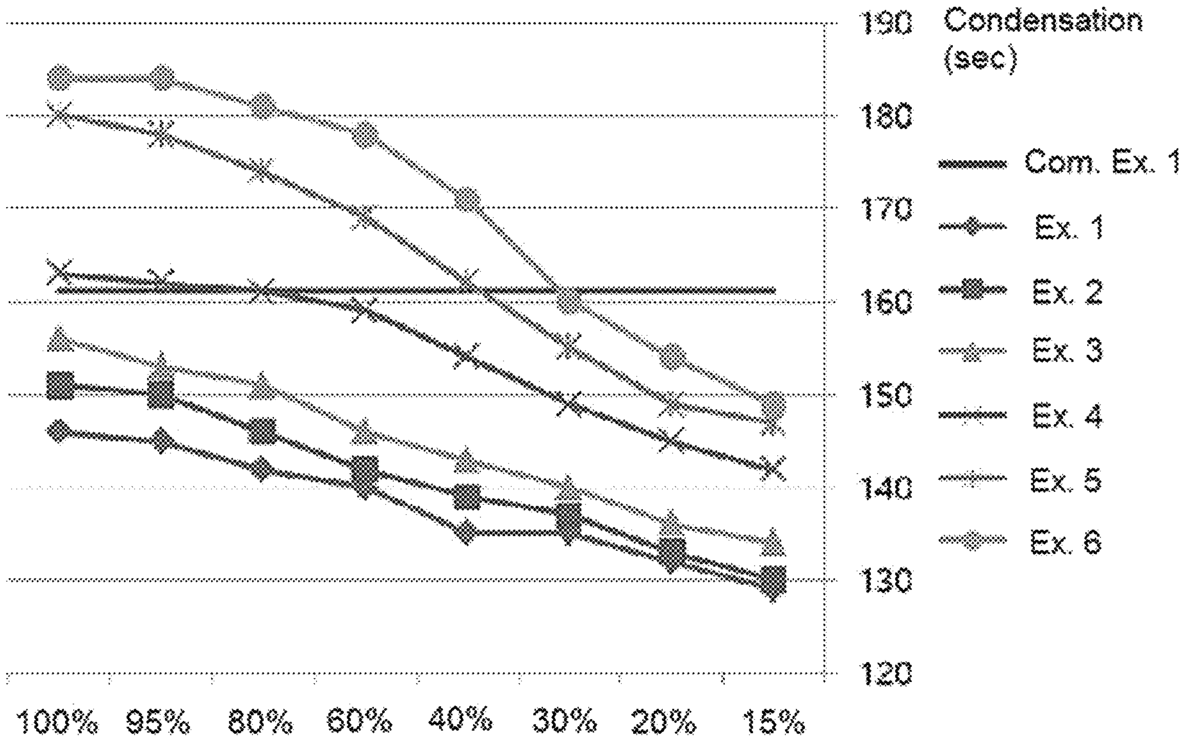
FIG. 4 shows the results of Table 2.

Whether a sulfonic group was synthesized in polystyrene in the SPS-based compound prepared in Preparation Example 2) was analyzed using FT-IR measurement. The results thereof are shown in FIG. 1. Also, in this case, the DS value was 35%. For comparison, FT-IR values of polystyrene not subjected to the sulfonation reaction are shown in FIG. 2.

In addition, the DS of the SPS-based compound may be inferred from the amount of the acetyl sulfate solution added. The DS may be measured more accurately through nuclear magnetic resonance (NMR) spectroscopy and matrix-assisted laser desorption ionization time-of-flight mass spectrometry (MALDI-ToF MS) when necessary. More details thereof can be found in the following paper.

Longhe Zhang, Bryan, C., "Sulfonation Distribution in Sulfonated Polystyrene lonomers Measured by MALDI-ToF MS". ACS Macro Lett, 2013, 2, 217-221.

Example 1: Preparation of Composition for Forming Plasterboard

Based on 100 parts by weight of hemihydrate gypsum usable in an actual plasterboard production plant, 70 parts by weight of water, 0.6 parts by weight of an admixture, 0.2 parts by weight of a hardening agent (potassium sulfate), and 0.06 parts by weight of a weight reducing agent (ammonium sulfate) were added and mixed for 10 seconds by a small mixer to prepare a composition for forming a plasterboard of Example 1.

In the case of the admixture, sulfonated polystyrene (SPS, solution) and a PCE-based compound were provided in a weight ratio of 50:50.

In addition, the SPS was based on Preparation Example 1. In particular, the weight average molecular weight of polystyrene provided for preparing the SPS-based compound was 10,000.

Examples 2 to 6 and Comparative Example 1

Compositions for forming a plasterboard of Examples 2 to 6 and Comparative Example 1 were prepared in the same manner as in Example 1, except that the weight average molecular weight or the compound (DS) was differently provided as an admixture as shown in Table 1 below. As the admixture in Comparative Example 1, a PNS-based admixture being used by a plasterboard producer was applied, and in this case, the weight average molecular weight thereof was 10,000.

Evaluation Example 1: Evaluation of Flowability and Apparent Setting Time of Composition for Forming Plasterboard The flowability and apparent setting time of the compositions for forming a plasterboard prepared in Examples 1 to 6 and Comparative Example 1 were measured according to the following method. The results for the flowability are shown in Tables 1 and 3, and for the apparent setting time are shown in Tables 2 and 4.

Evaluation of Flowability

After a composition for forming a plasterboard was poured into a circular mold having a diameter of 70 mm and a height of 40 mm, a diameter spread when demolding was performed after 10 seconds was measured. At this time, a circular spread slurry was measured in three places at intervals of 60 degrees, and a maximum value and a minimum value among measurement data were added and then divided by 2 to obtain a flow value.

TABLE 1

| DS Mw | 15% | 20% | 30% | 40% | 60% | 80% | 95% | 100% |
|---|---|---|---|---|---|---|---|---|
| Example 1 (10,000) | 128.6 | 124.3 | 121 | 116.4 | 111.2 | 108 | 107.6 | 107.5 |
| Example 2 (35,000) | 130 | 125.7 | 121.5 | 117.2 | 112.9 | 108.6 | 108.6 | 108 |
| Example 3 (190,000) | 137 | 134.5 | 132.2 | 129.8 | 127.4 | 122.7 | 119.1 | 118 |
| Example 4 (280,000) | 135 | 132.0 | 129 | 126 | 123 | 117 | 115 | 112 |
| Example 5 (350,000) | 131 | 128.0 | 126 | 123 | 121 | 116 | 113 | 110 |
| Example 6 (800,000) | 125.5 | 123.1 | 121.5 | 117 | 112.5 | 108.1 | 103.1 | 100.8 |

TABLE 1-continued

| DS Mw | 15% | 20% | 30% | 40% | 60% | 80% | 95% | 100% |
|---|---|---|---|---|---|---|---|---|
| Comparative Example 1 | | | | 118 | | | | |

(* unit: mm)

<Setting Time Test>

First, the composition for forming the plasterboard was poured into a rubber mold having a size of 50 mm×50 mm×50 mm, and the hardness was measured with a Shore durometer (type D). The time when the measured value reached 85 was set as the setting time (apparent setting time).

TABLE 2

| DS Mw | 15% | 20% | 30% | 40% | 60% | 80% | 95% | 100% |
|---|---|---|---|---|---|---|---|---|
| Example 1 (10,000) | 129 | 132 | 135 | 135 | 140 | 142 | 145 | 146 |
| Example 2 (35,000) | 130 | 133 | 137 | 139 | 142 | 146 | 150 | 151 |
| Example 3 (190,000) | 134 | 136 | 140 | 143 | 146 | 151 | 153 | 156 |
| Example 4 (280,000) | 142 | 145 | 149 | 154 | 159 | 161 | 162 | 163 |
| Example 5 (350,000) | 147 | 149 | 155 | 162 | 169 | 174 | 178 | 180 |
| Example 6 (800,000) | 149 | 154 | 160 | 171 | 178 | 181 | 184 | 184 |
| Comparative Example 1 | | | | 161 | | | | |

(* unit: seconds)

Evaluation Example 2: Evaluation of Foam Size of Plasterboard

A plasterboard was prepared from the compositions for forming the plasterboard prepared in Examples 1 to 6 and Comparative Example 1, and the average foam size was measured by observing the cross section of the plasterboard with a microscope (x500). The results thereof are shown in Table 3.

TABLE 3

| Example (DS 30%) | Average foam size (mm) |
|---|---|
| Example 1 (10,000) | 0.38 |
| Example 2 (35,000) | 0.42 |
| Example 3 (190,000) | 0.55 |
| Example 4 (280,000) | 0.61 |
| Example 5 (350,000) | 0.65 |
| Example 6 (800,000) | 0.75 |
| Comparative Example 1 | 0.50 |

First, referring to FIG. 1, in the case of the SPS-based compound according to the present invention, the DS thereof may be provided in a range of 15% to 99%.

In the case of Table 1 for confirming the flowability, it can be confirmed that the flowability improves as the DS value of SPS decreases, and it can be confirmed that the flowability is excellent when the DS of Examples is in a range of 15% to 60%, compared with Comparative Example. In particular, it was confirmed that the flowability was the best when the DS value was about 15% to about 35%, and when the DS value was lowered to 15% or less, SPS was not dispersed in water, and thus it was difficult to lower the DS value to 15% or less.

In the case of Table 2 for confirming the setting time, it can be confirmed that the setting time is shortened as the DS value of SPS decreases, and in the case of Example, it can be confirmed that the setting time is generally shortened, compared with Comparative Example.

In the case of Table 3 for observing the foam size, the weight of the plasterboards prepared from the compositions of Examples 1 to 6 was reduced because a sufficient foam size was secured. It was also confirmed that the foam size could be controlled according to the molecular weight of polystyrene. Thus, it can be confirmed that the SPS-based admixture is provided as the admixture to solve the existing problem that the foam size is small, and a higher weight reduction level can be provided compared with the conventional PNS-based admixture.

Therefore, in the preparation of the plasterboard according to the present invention, productivity is excellent, and the SPS-based admixture can be widely used as the admixture to provide superior performance than PNS-based admixture, and the SPS-based admixture can replace the PNS-based admixture.

As described above, although the present invention has been described with reference to limited embodiments and drawings, the present invention is not limited to these embodiments and various modifications and changes can be made thereto from these descriptions by those of ordinary skill in the art to which the present invention pertains. Therefore, the scope of the present invention should be determined only by the appended claims, and all equivalents or equivalent modifications thereof will fall within the scope and spirit of the present invention.

The invention claimed is:

1. A method for preparing an admixture for a plasterboard, comprising subjecting a polystyrene to a sulfonation with a sulfonating agent comprising a sulfuric acid to give a sulfonated polystyrene (SPS)-based compound of Formula 1, and adding water to the sulfonated polystyrene (SPS)-based compound of Formula 1 to prepare the admixture for a plasterboard:

<Formula 1>

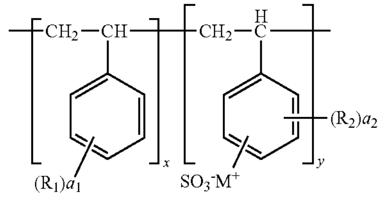

wherein, in Formula 1, $R_1$ and $R_2$ are selected from hydrogen, deuterium, —F, —Cl, —Br, —I, a hydroxyl group, a nitro group, a $C_1$-$C_{20}$ alkyl group, a $C_2$-$C_{20}$ alkenyl group, a $C_2$-$C_{20}$ alkynyl group, a $C_1$-$C_{20}$ alkoxy group, a $C_3$-$C_{10}$ cycloalkyl group, a $C_6$-$C_{20}$ aryl group, a $C_1$-$C_{20}$ heteroaryl group, a monovalent non-aromatic condensed polycyclic group, and a monovalent non-aromatic condensed heteropolycyclic group, $a_1$ is an integer selected from 1 to 5, $a_2$ is an integer selected from 1 to 4, $M^+$ is $H^+$, $Li^+$, $Na^+$, $K^+$, or $NH_4^+$, x is an integer selected from 5 to 50,000, and y is an integer selected from 1 to 50,000, wherein a degree of sulfonation (DS) of the SPS-based compound is in a range of 15% to 60%.

2. The method of claim 1, wherein a degree of sulfonation (DS) of the SPS-based compound is in a range of 15% to 40%.

3. The method of claim 1, wherein the sulfonating agent in the sulfonation reaction further comprises at least one selected from acetic anhydride, fuming sulfuric acid, and sulfur trioxide.

4. The method of claim 1, wherein a weight average molecular weight of the polystyrene is in a range of 10,000 to 800,000.

5. An admixture for a plasterboard prepared by the method according to claim 1.

6. A composition for forming a plasterboard, comprising gypsum, the admixture of claim 5, a hardening agent, a weight reducing agent, and water added during formation of the plasterboard.

7. The composition of claim 6, wherein the admixture further comprises a polycarboxylate ether (PCE)-based compound.

8. The composition of claim 7, wherein a weight ratio of the SPS-based compound to the PCE-based compound is 10:90 to 90:10.

9. A plasterboard comprising the composition for forming the plasterboard of claim 6.

10. The composition of claim 6, wherein the composition comprises 60-150 parts by weight of water based on 100 parts by weight of gypsum.

11. The method of claim 1, wherein a weight average molecular weight of the polystyrene is in a range of 190,000 to 800,000.

12. A method for preparing an admixture for a plasterboard, comprising polymerizing a monomer styrene and a monomer styrene sulfonic acid to give a sulfonated polystyrene (SPS)-based compound of Formula 1, and adding water to the sulfonated polystyrene (SPS)-based compound of Formula 1 to prepare the admixture for a plasterboard:

<Formula 1>

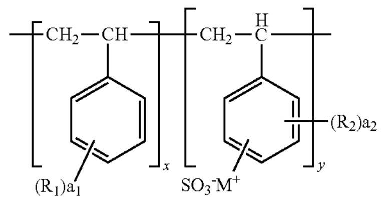

wherein, in Formula 1, $R_1$ and $R_2$ are selected from hydrogen, deuterium, —F, —Cl, —Br, —I, a hydroxyl group, a nitro group, a $C_1$-$C_{20}$ alkyl group, a $C_2$-$C_{20}$ alkenyl group, a $C_2$-$C_{20}$ alkynyl group, a $C_1$-$C_{20}$ alkoxy group, a $C_3$-$C_{10}$ cycloalkyl group, a $C_6$-$C_{20}$ aryl group, a $C_1$-$C_{20}$ heteroaryl group, a monovalent non-aromatic condensed polycyclic group, and a monovalent non-aromatic condensed heteropolycyclic group, $a_1$ is an integer selected from 1 to 5, $a_2$ is an integer selected from 1 to 4, $M^+$ is $H^+$, $Li^+$, $Na^+$, $K^+$, or $NH_4^+$, x is an integer selected from 5 to 50,000, and y is an integer selected from 1 to 50,000, wherein a degree of sulfonation (DS) of the SPS-based compound is in a range of 15% to 60%.

* * * * *